United States Patent [19]

Kobayashi et al.

[11] Patent Number: 5,578,373
[45] Date of Patent: Nov. 26, 1996

[54] SPLIT POLYETHYLENE STRETCHED MATERIAL AND PROCESS FOR PRODUCING THE SAME

[75] Inventors: Seizo Kobayashi; Takashi Mizoe; Yoshimu Iwanami; Osamu Otsu; Shigeki Yokoyama, all of Yokohama; Kazuhiko Kurihara, Tokyo; Hiroshi Yazawa, Kunitachi, all of Japan

[73] Assignees: Nippon Oil Co., Ltd.; Nippon Petrochemicals Co., Ltd.; Polymer Processing Research Institute Ltd., all of Tokyo, Japan

[21] Appl. No.: 357,089

[22] Filed: Dec. 15, 1994

Related U.S. Application Data

[63] Continuation of Ser. No. 22,840, Feb. 25, 1993, abandoned, which is a continuation-in-part of Ser. No. 784,707, Oct. 30, 1991, abandoned.

[30] Foreign Application Priority Data

Nov. 1, 1990 [JP] Japan ..................... 2-293625
May 22, 1991 [JP] Japan ..................... 3-117656

[51] Int. Cl.$^6$ .................... D02G 1/02; D02G 3/00; B29K 43/48

[52] U.S. Cl. .................... 428/364; 264/103; 264/126; 264/147; 264/288.4; 264/DIG. 47; 428/371; 428/901

[58] Field of Search .................... 64/126, 570, 146, 64/147, 103, 211, DIG. 47, 288.4; 428/364, 357, 371, 902

[56] References Cited

U.S. PATENT DOCUMENTS

| | | | |
|---|---|---|---|
| 2,185,789 | 1/1940 | Jacqué .................... | 264/147 |
| 3,444,683 | 5/1969 | Hessenbruch .................... | 264/147 |
| 3,488,411 | 1/1970 | Goldman .................... | 264/126 |
| 3,492,389 | 1/1970 | Port et al. .................... | 264/147 |
| 3,577,724 | 5/1971 | Greene .................... | 264/DIG. 47 |
| 3,639,573 | 2/1972 | Port .................... | 264/147 |
| 3,985,599 | 10/1976 | Lepoutre et al. .................... | 264/147 |
| 4,129,632 | 12/1978 | Olson et al. .................... | 264/147 |
| 4,134,951 | 1/1979 | Dow et al. .................... | 264/147 |
| 4,814,131 | 3/1989 | Atlas .................... | 264/147 |
| 4,925,602 | 5/1990 | Hill et al. .................... | 264/147 |
| 5,026,511 | 6/1991 | Sano et al. .................... | 264/126 |
| 5,091,133 | 2/1992 | Kobayashi et al. .................... | 264/126 |
| 5,106,555 | 4/1992 | Kobayashi et al. .................... | 264/126 |
| 5,106,558 | 4/1992 | Kobayashi et al. .................... | 264/126 |
| 5,200,129 | 4/1993 | Kobayashi et al. .................... | 264/120 |

FOREIGN PATENT DOCUMENTS

| | | | |
|---|---|---|---|
| 0046526 | 3/1982 | European Pat. Off. .................... | 264/126 |
| 0253513 | 1/1988 | European Pat. Off. . | |
| 0417832 | 3/1991 | European Pat. Off. .................... | 264/148 |
| 2118593 | 10/1972 | Germany .................... | 264/147 |
| 2505710 | 8/1975 | Germany .................... | 264/147 |
| 55-62211 | 5/1980 | Japan .................... | 264/147 |
| 51-52026 | 11/1980 | Japan .................... | 264/147 |
| 59-130313 | 7/1984 | Japan . | |
| 60-101032 | 6/1985 | Japan . | |
| 1197465 | 7/1970 | United Kingdom .................... | 264/147 |

OTHER PUBLICATIONS

Thesaurus of Textile Terms, 2nd ed., Backer and Valko ed., MIT. Press, Cambridge, Mass., 1969, pp. 201, 210.
Whittington's Dictionary of Plastics, p. 198 Technomic Publishing Co., Inc. Stamford, CT. 1968.

*Primary Examiner*—Jay H. Woo
*Assistant Examiner*—Duane S. Smith
*Attorney, Agent, or Firm*—Oblon, Spivak, McClelland, Maier & Neustadt, P.C.

[57] ABSTRACT

The present invention provides a split polyethylene stretched material having a tensile strength of at least 0.7 GPa when twisted in the range of 50–500 times/m, which material is produced by subjecting a polyethylene having an intrinsic viscosity of 5–50 dl/g as measured at 135° C. in decalin, i.e. an ultra-high-molecular-weight polyethylene to stretching and then subjecting the stretched polyethylene to splitting, as well as a process for producing said material. The split polyethylene stretched material according to the present invention has a large surface area and accordingly can be easily laminated to other materials, and has a high strength and flexibility.

14 Claims, 3 Drawing Sheets

SPLIT POLYETHYLENE STRETCHED MATERIAL AND PROCESS FOR PRODUCING THE SAME

This application is a Continuation of application Ser. No. 08/022,840, filed on Feb. 25, 1993, now abandoned, which is a Continuation-in-Part of application Ser. No. 07/784,707, filed Oct. 30, 1991, abandoned.

BACKGROUND OF THE INVENTION a) Field of the Invention

The present invention relates to a split polyethylene stretched material and a process for producing said material. More particularly, the present invention relates to an ultra-high-molecular-weight polyethylene stretched material which has a high strength and flexibility and which can be easily laminated to other materials.

b) Description of the Related Art

It is known to mold an ultra-high-molecular-weight polyethylene into a sheet or a tape and then stretch the sheet or tape to obtain a high-strength and high-modulus polyethylene material.

For example, it is described in Japanese Patent Application Laid-Open No. 130313/1984 to melt-mix an ultra-high-molecular-weight polyethylene and a wax, extrude the resulting mixture, and cool, solidify and then stretch the extrudate.

Also, it is described in Japanese Patent Application Laid-Open No. 101032/1985 to cool an ultra-high-molecular-weight polyethylene solution, compression-mold the resulting gel-like material, and stretch the compression-molded product.

Further, it is described in EP 253513A1 (1988) to compression-mold an ultra-high-molecular-weight polyethylene at a temperature lower than the melting point of the polyethylene and stretch the compression-molded product.

The ultra-high-molecular-weight polyethylene sheets or tapes obtained by the above processes are lightweight and have a high strength and excellent water resistance; therefore, they are intertwisted to be used as marine ropes, or weaved into cloths to be used as explosion-proof sheets, etc.

These ropes or cloths, however, have not only a high-strength but also a high modulus; therefore, they lack flexibility. Moreover, the above stretched sheets or tapes, when laminated to obtain a laminate or made into a composite material with other material, are unable to produce a sufficient adhesion strength because their area of contact with a resin or other material is limited.

Conventional split yarns are produced mainly from a polyolefin (raw material). They are used in ropes for ships, yachts, mount climbing, etc.; threads such as machine cotton, thread for making tatami, and the like; yarns for bag making; and so forth. Also, webs obtained by subjecting a wide stretched film to splitting are used as non-woven fabrics obtained by laminating a split fiber warp sheet and a split fiber weft sheet, or cross-laminated non-woven split fabrics.

Split yarns have various features; for example, they are softer than conventional monofilaments and have a square cross-section, a large surface area and a high friction coefficient. They further have a feature in that they can be made into a mono-axially stretched wide reticulate web. The biggest feature of split yarns, however, is that they can be produced at a low cost by using a simple apparatus which comprises only a flat yarn-producing apparatus and a splitter integrated thereinto. Because of the low cost, split yarns are used in industry.

Conventional split yarns ordinarily have a strength of about 3–4.5 g/d (a strength per denier expressed in g) which is not so high. Therefore, if their strength can be increased 2- or 3-fold with their low cost feature being maintained, such an improved split yarn can be used for the manufacture of, for example, a very light rope for mountain climbing a light and strong flexible container and a light and strong cross-laminated non-woven fabric. The improved split yarn can also find new applications such as polyolefin prepreg and the like, by further utilizing the other properties, i.e. large surface area and spreadability to crosswide direction. Thus, it has been strongly desired to develop a low cost and strong split yarn; however, none of the conventional techniques have been able to provide such a split yarn.

OBJECTS AND SUMMARY OF THE INVENTION

A primary object of the present invention is to provide a split polyethylene stretched material having a high strength and flexibility.

Another object of the present invention is to provide a split polyethylene stretched material which has a large surface area and accordingly can be easily laminated to other materials.

Still another object of the present invention is to provide a process for producing a split polyethylene material, which is economical and which can be used in new applications.

The above objects of the present invention can be achieved by providing a split polyethylene stretched material having a tensile strength of at least 0.7 GPa when twisted in the range of 50–500 times/m, which material is produced by subjecting a polyethylene having an intrinsic viscosity of 5–50 dl/g as measured at 135° C. in decalin, to stretching and then subjecting the stretched polyethylene to splitting, and also by providing a process for producing a split polyethylene stretched material, which comprises stretching a polyethylene having an intrinsic viscosity of 5–50 dl/g as measured at 135° C. in decalin, to a total draw ratio of 20-fold or more and subjecting the stretched polyethylene to splitting.

The split polyethylene stretched material of the present invention has various features such as high strength, flexibility and the like. The split polyethylene stretched material further has a very large surface area and accordingly can be easily laminated to other materials; this, coupled with the high strength and flexibility, makes it easy to produce a high-strength laminate. Moreover, in the production of the split polyethylene stretched material, no solvent is used and stretching can be carried out in a solid state wherein melting is unnecessary, which results in excellent economy, enables stretching of high draw ratio and makes it possible to obtain a split polyethylene stretched material of high strength.

DETAILED DESCRIPTION OF THE INVENTION

Figure 1:
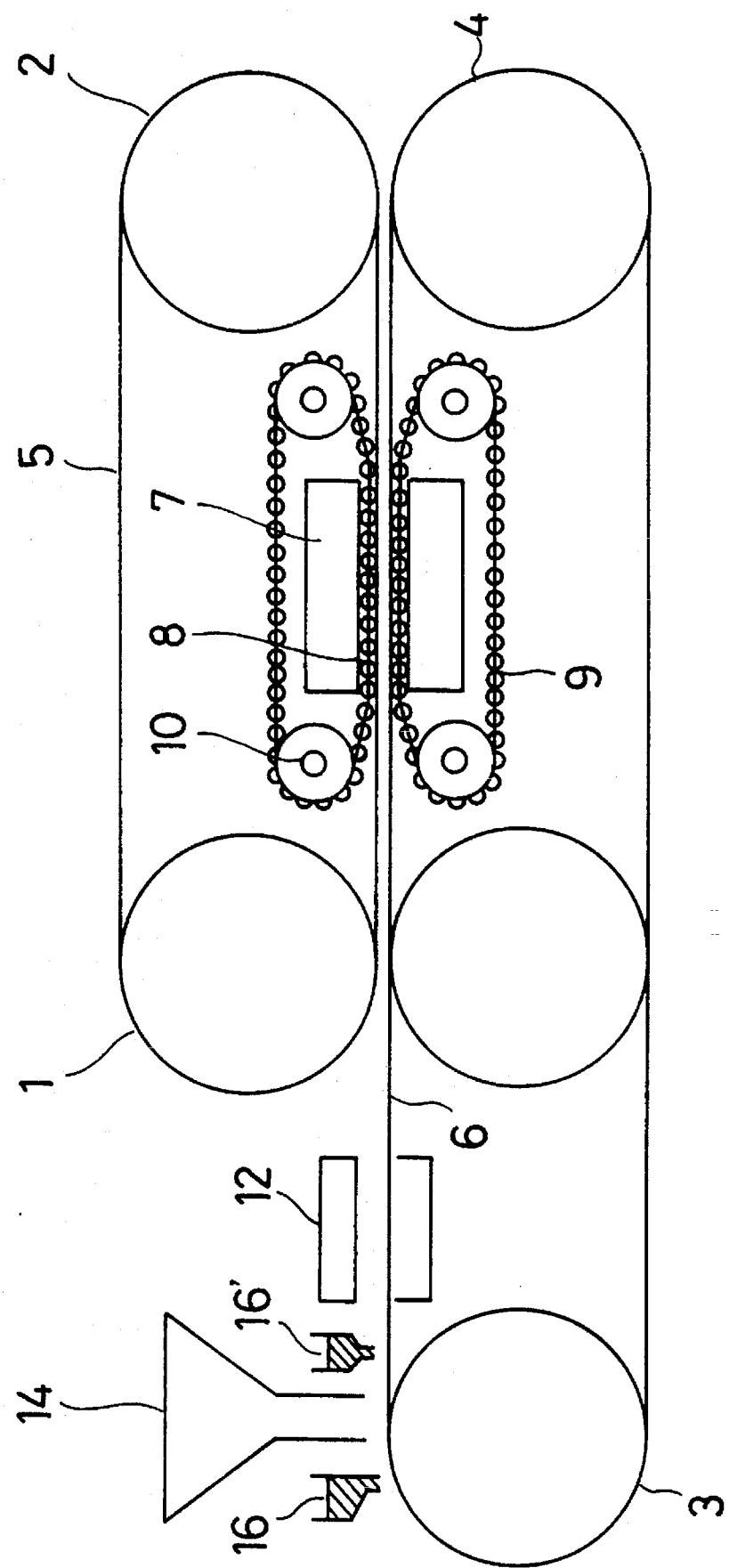
FIG. 1 is an example of the schematic illustration showing the apparatus used in the production process of the present invention.

The split polyethylene stretched material of the present invention is obtained by subjecting a polyethylene having an intrinsic viscosity of 5–50 dl/g as measured at 135° C. in decalin, a so-called ultra-high-molecular-weight polyethylene (hereinafter abbreviated to an ultra-high-molecular-weight polyethylene) to stretching and then to splitting. First, description is made on the process for producing an ultra-high-molecular-weight polyethylene stretched material.

Production of ultra-high-molecular-weight polyethylene powder

The ultra-high-molecular-weight polyethylene used in the present invention has an intrinsic viscosity of 5–50 dl/g, preferably 8–40 dl/g, more preferably 10–30 dl/g as measured at 135° C. in decalin, which corresponds to a viscosity-average molecular weight of 500,000–12,000,000, preferably 900,000–9,000,000, more preferably 1,200,000–6,000,000.

An intrinsic viscosity lower than 5 dl/g results in a stretched material having poor mechanical properties. such a low intrinsic viscosity is therefore not preferred. On the other hand, an intrinsic viscosity higher than 50 dl/g leads to poor processability in stretching. Such a high intrinsic viscosity is not preferred either.

The form of the ultra-high-molecular-weight polyethylene is not particularly restricted. However, a granular or powdery polyethylene is preferred ordinarily; the particle diameter is, for example, 2,000 µm or less, preferably 1–2,000 µm, more preferably 10–1,000 µm, and the particle diameter distribution is preferably narrow because the polyethylene having such a particle diameter distribution, when compression-molded, gives a sheet or film which has very few defects and is homogeneous.

The ultra-high-molecular-weight polyethylene having the above-mentioned properties, employed in the present invention can be obtained by homopolymerizing ethylene or copolymerizing ethylene and an α-olefin of 3 or more carbon atoms, etc. in the presence of a catalyst which comprises (a) a catalyst component containing at least one compound of at least one transition metal element of groups IV–VI of the periodic table and, as necessary, (b) an organometal compound.

As the α-olefin, there is used an α-olefin ordinarily having 3–12 carbon atoms, preferably 3–6 carbon atoms. Specific examples include propylene, butene-1, 4-methyl- pentene-1, hexene-1, octene-1, decene-1 and dodecene-1.

Among these, particularly preferred are propylene, butene-1, 4-methylpentene-1 and hexene-1. It is possible to further use in combination one or more dienes as comonomer or comonomers, for example, butadiene, 1,4-hexadiene, vinylnorbornene, ethylidene-norbornene and the like. The content of the α-olefin in the ethylene-α-olefin copolymer is 0.001–10 mole %, preferably 0.01–5 mole %, more preferably 0.1–1 mole %.

Preferred specific examples of the at least one compound of at least one transition metal of groups IV–VI of the periodic table, said compound constituting the catalyst component, include titanium compounds, vanadium compounds, chromium compounds, zirconium compounds and hafnium compounds. Two or more of these compounds may be used in combination.

The titanium compounds include titanium halides, alkoxyhalides, alkoxides, halogen oxides, etc. Titanium (IV) compounds and titanium (III) compounds are suitable.

Specific exemplary titanium (IV) compounds include those represented by the following general formula:

$$Ti(OR)_n X_{4-n}$$

wherein R is an alkyl group having 1–20 carbon atoms, preferably 1–12 carbon atoms or an aralkyl group, X is a halogen atom, and n is $0 \leq n \leq 4$. Titanium tetrachloride is particularly preferred.

The titanium (III) compounds include titanium trihalides such as titanium trichloride and the like. Also included are titanium (III) compounds which are obtained by reducing, with an organometallic compound of a metal of groups I–III of the periodic table, titanium (IV) alkoxyhalides represented by the following general formula:

$$Ti(OR)_m X_{4-m}$$

wherein R is an alkyl group having 1–20 carbon atoms, an aryl group or an aralkyl group, X is a halogen atom, and m is $0 \leq m \leq 4$.

Of these titanium compounds, titanium (IV) compounds are particularly preferred.

The vanadium compounds include vanadium halides, alkoxyhalides, alkoxides, halogen oxides, etc. Specifically, there are mentioned vanadium (IV) compounds, e.g., vanadium tetrahalides such as vanadium tetrachloride and the like, and tetraethoxyvanadium; vanadium (V) compounds such as vanadium oxytrichloride, ethoxydichlorovanadyl, triethoxyvanadyl and tributoxyvanadyl; and vanadium (III) compounds such as vanadium trichloride and vanadium triethoxide.

The above titanium compounds or vanadium compounds may be treated with one or more electron-donating compounds. The electron-donating compounds include ethers, thioethers, thiolphosphines, stibines, arsines, amines, ketones, esters, etc.

The titanium compounds or vanadium compounds may be used in combination with a magnesium compound. The magnesium compound includes metallic magnesium, magnesium hydroxide, magnesium carbonate, magnesium oxide, magnesium fluoride, magnesium chloride, magnesium bromide, magnesium iodide, etc.; double salts, double oxides, double carbonates, double chlorides, double hydroxides, etc., each of which contains a metal selected from silicon, aluminum and calcium in combination with magnesium; magnesium compounds obtained by reacting these inorganic solid compounds with oxygen-containing compounds, sulfur-containing compounds, aromatic hydrocarbons or halogen-containing substances; and magnesium compounds obtained by incorporating the above magnesium compounds in silicon-containing and/or aluminum-containing oxides.

When the titanium compound or vanadium compound is used in combination with the magnesium compound, no particular limitation is imposed on the manner in which they are contacted. A suitable known method can be employed.

Examples of the oxygen-containing compounds include water; organic oxygen-containing compounds such as alcohols, phenols, ketones, aldehydes, carboxylic acids, esters, polysiloxanes, acid amides and the like; and inorganic oxygen-containing compounds such as metal alkoxides, metal oxychlorides and the like. Examples of the sulfur-containing compounds include organic sulfur-containing compounds such as thiols and thioethers; and inorganic sulfur-containing compounds such as sulfur dioxide, sulfur trioxide and sulfuric acid. Examples of the aromatic hydrocarbons include various monocyclic and polycyclic aromatic hydrocarbon compounds such as benzene, toluene, xylene, anthracene and phenanthrene. Examples of the halogen-containing substances include chlorine; and compounds such as hydrogen chloride, metal chlorides and organohalides.

Other illustrative catalyst systems include those composed of reaction products of organomagnesium compounds and titanium compounds, such as Grignard compounds and the like, in combination with organomagnesium compounds.

Still other exemplary catalyst systems include those composed of solid substances, which are obtained by contacting inorganic oxides such as $SiO_2$, $Al_2O_3$ and the like with the above-described solid catalyst components containing at least magnesium and titanium, in combination with organoaluminum compounds.

In these catalyst systems, the titanium compound can be used as an adduct with an organic carboxylic acid ester, and the above-described magnesium-containing inorganic solid compound can be used subsequent to its contact with an organic carboxylic acid ester. Further, no problem will arise from the use of the organoaluminum compound as an adduct with an organic carboxylic acid ester. In all cases, catalyst systems prepared in the presence of an organic carboxylic acid can be used without any problem.

Specific examples of the chromium compounds include catalysts called generally "Phillips catalysts", which are obtained by causing chromium trioxide or compounds, said compounds being capable of at least partly forming a chromium oxide upon calcination, to be supported on inorganic oxide carriers. The inorganic oxide carriers include silica, alumina, silica-alumina, titania, zirconia, thoria, and mixtures thereof, among which silica and silica-alumina are preferred.

The chromium compound to be carried include chromium oxides and compounds capable of at least partly forming a chromium oxide upon calcination, for example, chromium halides, oxyhalides, nitrates, acetates, sulfates and alcoholates. Specifically, there are mentioned chromium trioxide, chromyl chloride, potassium dichromate, ammonium chromate, chromium nitrate, chromium acetate, chromium acetylacetonate, di-t-butyl chromate, etc.

Bearing of the chromium compound on a carrier can be carried out by a known method such as impregnation, solvent distillation, sublimation or the like. A suitable method can be chosen depending upon the type of the chromium compound to be used. Chromium may be borne in a proportion of 0.1–10% by weight, preferably 0.3–5% by weight, more preferably 0.5–3% by weight, all in terms of chromium atoms based on the carrier.

The carrier with the chromium compound borne thereon as described above is then baked to activate the same. The baking for activation is usually conducted in a non-reducing atmosphere substantially free of water, for example, in the presence of oxygen. It may however be effected in the presence of an inert gas or under reduced pressure. Use of dry air is preferred. The baking is carried out at 450° C. or higher, preferably at 500°–900° C., for several minutes to several hours, preferably for 0.5–10 hours. During the baking, it is preferred to use sufficient dry air so that the activation can be effected in a fluidized state.

The activity and the like may be adjusted by making use of a conventional method, for example, by adding a titanate, a fluorine-containing salt or the like when the carrier is caused to bear the chromium compound or the chromium-compound-bearing carrier is baked.

The chromium-compound-bearing carrier may be used subsequent to its reduction with carbon monoxide, ethylene, an organoaluminum compound or the like.

The zirconium compounds and hafnium compounds include, for example, those containing a conjugated-π-electron-containing group as a ligand. Specific examples include zirconium compounds and hafnium compounds represented by the following general formula:

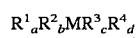

$$R^1_a R^2_b MR^3_c R^4_d$$

wherein M is a zirconium or hafnium atom, $R^1$, $R^2$, $R^3$ and $R^4$ are each a hydrocarbon residuum having 1–20 carbon atoms, a halogen atom or a hydrogen atom with the proviso that at least one of $R^1$, $R^2$, $R^3$ and $R^4$ is the hydrocarbon residuum, and a, b, c and d are values satisfying the following equation:

$$a+b+c+d=4$$

Preferred examples of the hydrocarbon residuum in the above formula include alkyl groups, aryl groups, cycloalkyl groups, aralkyl groups, alkoxyl groups, cycloalkadienyl groups, sulfur-containing hydrocarbon residua, nitrogen-containing hydrocarbon residua, and phosphorus-containing hydrocarbon residua.

Examples of the alkyl groups include methyl, ethyl, propyl, isopropyl, butyl, hexyl, octyl, 2-ethylhexyl, decyl and oleyl. Examples of the aryl groups include phenyl and tolyl. Examples of the cycloalkyl groups include cyclopentyl, cyclohexyl, cyclooctyl, norbornyl and bicyclononyl. Examples of the aralkyl groups include benzyl and neophyl. Examples of the cycloalkadienyl groups include cyclopentadienyl, methylcyclopentadienyl, ethylcyclopentadienyl, dimethylcyclopentadienyl, indenyl and tetrahydroindenyl. Examples of the alkoxyl groups include methoxy, ethoxy, propoxy and butoxy. Examples of the sulfur-containing hydrocarbon residua include thioethyl and thiophenyl. Further, examples of the nitrogen-containing hydrocarbon residua include dimethylamide, diethylamide and dipropylamide.

In addition, unsaturated aliphatic residua such as vinyl, allyl, propenyl, isopropenyl, 1-butenyl and the like, as well as unsaturated alicyclic groups such as cyclohexenyl and the like can also be mentioned by way of example. Examples of the halogen atoms include fluorine, chlorine and bromine.

Needless to say, these zirconium compounds and hafnium compounds can also be used by having them borne on the inorganic oxide carriers described above.

The organometallic compound usable in the process of the present invention for the production of the ultra-high-molecular-weight polyethylene powder include organometallic compounds of metals of groups I–IV of the periodic table, which are known as components of Ziegler catalysts. Preferred are organoaluminum compounds represented by the following general formula:

$$R_n AlX_{3-n}$$

wherein R is an alkyl group having 1–20 carbon atoms, an aryl group or an alkoxyl group, X is a halogen atom, and n is $0 \leq n \leq 3$ with the proviso that, when $n \geq 2$, the individual Rs may be the same or different; and organozinc compounds represented by the following general formula:

wherein the individual Rs may be the same or different and are alkyl groups having 1–20 carbon atoms. These organoaluminum and organozinc compounds may be used in combination.

The organoaluminum compounds include, for example, triethylaluminum, triisobutylaluminum, tri-n-hexylaluminum, diethylaluminum chloride, monoethoxydialkyl aluminums, and diethoxymonoalkyl aluminums. It is also possible to use compounds obtained by reacting trialkylaluminums with water, which are represented by the following general formula:

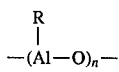

wherein R is a hydrocarbon group having 1–18 carbon atoms, n is $2 \leq n \leq 100$, preferably $2 \leq n \leq 50$.

No particular limitation is imposed on the amount of the organometallic compound to be used. In general, it may be used in an amount 0.1–1,000 molar times the transition metal compound.

The polymerization reaction can be carried out in a vapor phase or a solvent inert to the above-described catalyst while maintaining the reaction system substantially free of oxygen, water and the like. Illustrative of the inert solvent include aliphatic hydrocarbons such as butane, isobutane, pentane, hexane, octane, decane, dodecane and the like; alicyclic hydrocarbons such as cyclopentane, cyclohexane and the like; aromatic hydrocarbons such as benzene, toluene and the like; and petroleum fractions. The monomer or monomers of the polymerization reaction can also be used as a solvent. The desirable polymerization temperature is lower than the melting point of the polyethylene to be formed, ordinarily from $-20°$ to $+100°$ C., preferably from $0°$ to $90°$ C.

If the polymerization temperature is higher than the melting point of the ultra-high-molecular-weight polyethylene to be obtained, it is difficult to stretch the polyethylene to a draw ratio of 20-fold or greater in the stretching stage as a subsequent step. Such high polymerization temperatures are therefore not preferred.

The polymerization pressure is ordinarily within a range of 0–70 kg/cm²G, preferably 0–60 kg/cm²G.

The molecular weight can be controlled by changing the polymerization conditions, for example, the polymerization temperature, the polymerization pressure, the type of the catalyst, the molar ratio of the catalyst components, and hydrogen gas addition into the polymerization system.

It is also possible to conduct, without problems, the polymerization in two or more stages in which polymerization conditions such as hydrogen concentration, polymerization temperature and the like are varied.

Thus, an ultra-high-molecular-weight polyethylene of powdery form can be obtained.

Production of polyethylene stretched material

The thus obtained ultra-high-molecular-weight polyethylene having an intrinsic viscosity of 5–50 dl/g as measured at 135° C. in decalin is then stretched. The stretching method employed includes, for example, a method wherein the polyethylene is melted and then stretched; a method wherein the polyethylene is dissolved in a large amount of a solvent and the resulting gel-like material of sheet shape is stretched; and a method wherein the polyethylene itself is stretched in a solid state without being dissolved in a solvent or without being melted. Of these, preferred is the method wherein the polyethylene is stretched in a solid state.

In the method wherein the polyethylene is stretched in a solid state, the ultra-high-molecular-weight polyethylene is stretched at a temperature lower than the melting point of the polyethylene. It is generally preferable to carry out, prior to the stretching, rolling of the polyethylene at a temperature lower than the melting point of the polyethylene. It is more preferable to carry out, prior to the rolling, compression molding of the polyethylene at a temperature lower than the melting point of the polyethylene. It is most preferable to carry out compression molding, rolling and stretching of the polyethylene in this order.

The method of compression molding is not particularly restricted, and any of a batchwise method and a continuous method can be employed. The batchwise compression molding method includes methods using various apparatuses of sliding type or rotary type. The continuous compression molding method includes various methods, for example, a method wherein a powder containing, as the basic component, the above-mentioned ultra-high-molecular-weight polyethylene is held between a pair of endless belts and is compression-molded while the endless belts are transferred. A continuous compression molding method is preferable in the present invention in view of the workability and the productivity of long stretched material.

The continuous compression molding step is described in detail. First, brief description is made on FIG. 1 which shows an example of the apparatus used for the step.

The apparatus is fundamentally constructed of a pair of upper and lower endless belts 5,6 opposed to each other and maintained taut by rolls 1–4, two platens 7 for compressing a powder via the endless belts 5,6, and two sets of rollers 8 with each set of rollers connected to each other and rotatably disposed between the corresponding platen and the corresponding endless belt.

The compressing means in the present invention comprises two platens each arranged inside the corresponding endless belt and two sets of rollers with each set of rollers rotatably disposed between the corresponding platen and the corresponding endless belt. Preferably, each set of rollers has a number of rollers arranged closely at intervals only sufficient to avoid their mutual contact with their axes of rotation extending substantially at right angles relative to the travelling direction of the corresponding endless belt.

These rollers are rotatable about their corresponding central shafts. These shafts are fixed at both ends thereof on corresponding chains 9. The chains 9 are maintained in engagement with corresponding sprockets 10 arranged on both upstream and downstream sides of the corresponding platens 7, whereby these rollers are driven preferably at a speed about half the running speed of the endless belts.

Each set of rollers may be fixedly disposed between the endless belt and the platen by means of a frame or the like.

No particular limitation is imposed on the platens, as long as their surfaces at which the platens are brought into contact with the corresponding rollers are smooth and can evenly transmit pressure.

Figure 2:
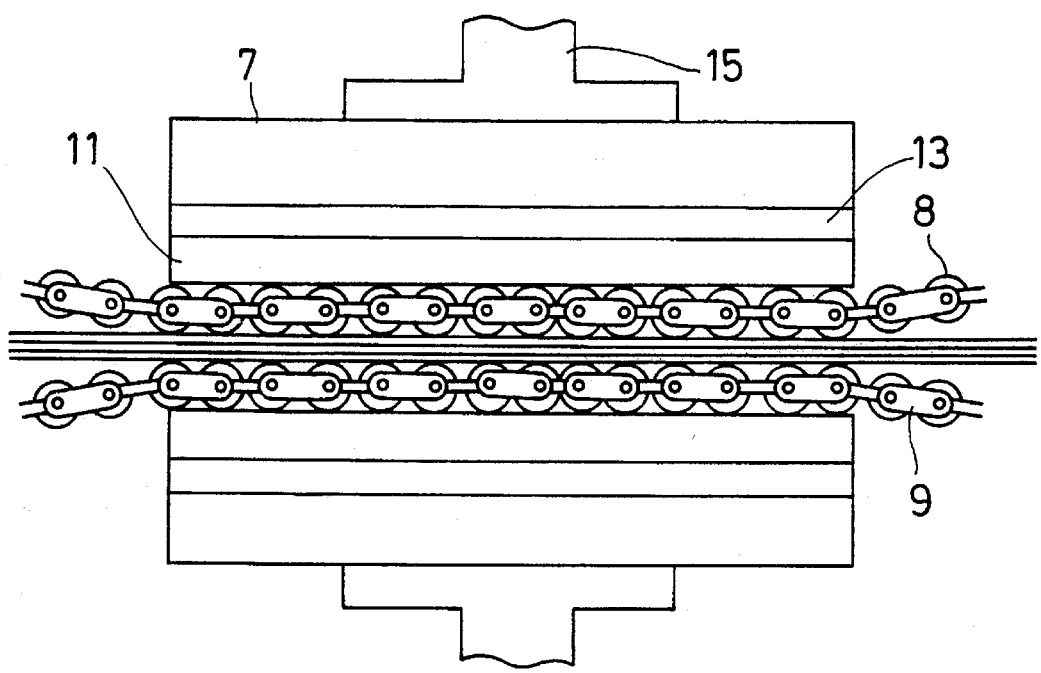
FIG. 2 is an example of the enlarged illustration showing the compressing zone and its vicinity of the apparatus of FIG. 1.

The length of each platen in the running direction of the corresponding endless belt is not particularly restricted, but is usually 30–400 cm, with about 50–200 cm being preferred. Although it is the primary role of the platens to compress the ultra-high-molecular-weight polyethylene powder via the endless belts, the platens may also be used as a heating means for the powder. It is practical and convenient to arrange a heating means 11 in each platen 7 as shown in FIG. 2 so that the powder can be heated by the platen via the corresponding rollers and the corresponding endless belt. It is also practical and convenient to arrange a preheater 12 in the proximity of the endless belt 6 as depicted in FIG. 1 so that the powder can be heated by the preheater 12.

As to the manner of arrangement of the heating means 11 in each platen, an electric heater can be embedded within the platen 7 after providing the platen with a heat insulation layer 13. As an alternative, a flow passage for the circulation of a heating medium can be disposed inside each platen to heat the platen with the heating medium.

In practising the production process of the present invention by using the illustrative apparatus, the ultra-high-molecular-weight polyethylene powder charged and stored in a hopper 14 is dropped onto the endless belt 6. Optionally, a polyolefin powder or the like having a lower melting point than the ultra-high-molecular-weight polyethylene powder is scattered from scatters 16,16'.

The appropriate running speed of each endless belt may generally be 10–500 cm/min, preferably about 50–200 cm/min, although it also depends on the length of the platen and the conditions for the compression molding. The ultra-high-molecular-weight polyethylene powder or its mixture with an olefin polymer, which is placed on the endless belt 6, is formed into a predetermined cross-sectional shape by a doctor blade. After the polyethylene powder or its mixture is preheated by the preheater 12 if necessary, it is conveyed to a squeezing zone defined by the upper and lower endless belts and then to a compression zone where the two sets of rollers and the platens are arranged. In the compression zone, a pressure from a hydraulic cylinder (not shown) is transmitted to a hydraulic piston 15 and then to each platen 7, and further is applied to the powder via the rollers and the endless belts. In this case, heat from each heating means is also similarly transmitted to the powder via the rollers and the endless belts, whereby the temperature of the powder is maintained at a predetermined temperature.

After the powder has been compression-molded as described above and the resulting sheet has been conveyed past the rolls 2 and 4, the sheet leaves the endless belts 5,6. Thus, a compression-molded sheet is formed continuously.

In the present invention, the pressure employed during compression molding can be selected within a wide range, but desirably is selected within the range of ordinarily 0.01 MPa to 2 GPa, preferably 1–500 MPa. When the compression molding is carried out continuously, even a low pressure of ordinarily 0.01–10 MPa, preferably about 0.1–5 MPa enables satisfactory molding in some cases by appropriately selecting the compression molding conditions. The temperature employed during compression molding is preferably lower than the melting point of the ultra-high-molecular-weight polyethylene and is ordinarily 20° C. to a temperature lower than the melting point, preferably 90°–140° C., more preferably 110°–135° C.

Next, description is made on the rolling step. A known rolling method such as rolling by pressure rolls can be used. The ultra-high-molecular-weight polyethylene or the above-mentioned compression-molded sheet of ultra-high-molecular-weight polyethylene is squeezed by pressure rolls which rotate in opposite directions, while maintaining the polyethylene or the sheet in a solid state without melting it, whereby a rolled sheet or film is obtained. In this case, the deformation ratio of the material by the rolling operation can be selected in a wide range. It is selected in the range of usually 1.2–20, preferably 1.5–10 in terms of rolling efficiency (length after rolling/length before rolling). The rolling temperature is generally not lower than 20° C. but below the melting point of the ultra-high-molecular-weight polyethylene powder employed in the present invention, preferably not lower than 50° C. but below the melting point, more preferably 90°–140° C., most preferably 110°–135° C. The above rolling operation may of course be carried out in two or more stages.

Stretching can be carried out by various methods. Any stretching method can be used as long as the objects of the present invention are not impaired. As the heating means, there can be used hot air stretching, cylinder stretching, roll stretching, hot plate stretching, etc. As the means for applying a tension for stretching, there can be used stretching between nip rolls, stretching between crowbar rolls or multistage rolls, and stretching with the applied tension being maintained according to a Nelson roll method.

The stretching temperature is lower than the melting point of the material to be stretched, and is generally 20°–160° C., preferably 60°–150° C., more preferably 90°–145° C., particularly preferably 90°–140° C. The stretching step can be performed not only in one stage but also in multiple stages. When the stretching step is carried out in multiple stages, it is preferred to carry out the second stage at a higher temperature than the first stage.

The stretching speed varies depending on the method of stretching and the molecular weight and composition of the polymer, and can be determined appropriately. It is usually in the range of 1 mm/min to 500 m/min. Specifically, in the case of batchwise stretching, the stretching speed is usually in the range of 1–500 mm/min, preferably 1–100 mm/min, more preferably 5–50 mm/min. In the case of continuous stretching, the stretching speed is usually in the range of 0.1–500 m/min, preferably 1–200 m/min, more preferably 10–200 m/min. Taking the economy into consideration, setting of a high stretching speed is preferred.

With respect to the draw ratio, it is desirable to employ a draw ratio as high as possible, because a higher draw ratio can provide a stretched material of higher strength. The draw ratio is usually 1.5- to 50-fold, preferably 2- to 40-fold, more preferably 3- to 30-fold. In the present invention, the total draw ratio which is the sum of the draw ratio upon rolling and that upon stretching can be set usually at 20-fold or more, preferably 30-fold or more, more preferably 60-fold or more, particularly preferably 80- to 200-fold. Such a total draw ratio is desirable.

When stretching is carried out in a solid state, the compression molding step and/or the rolling step, each of which is carried out prior to the stretching step, is carried out desirably at a temperature lower than the melting point [Tm0 (° C)] of the ultra-high-molecular-weight polyethylene used. When the compression molding step and/or the rolling step is conducted at a temperature higher than Tm0, the subsequent stretching step may be adversely affected. Incidentally, in the solid-state compression molding step and/or the solid-state rolling step, it is preferable that the melting point [Tm1 (° C.)] of the compression-molded material or the rolled material satisfy the following formula.

$$Tm1 \geq Tm0 - 5$$

When stretching is carried out in a solid state, it is possible, in the compression molding step conducted prior to the stretching step, to allow a liquid organic compound such as decalin, xylene, n-paraffin or the like to exist together with the polyethylene to an extent that the objects of the present invention are not impaired. In the compression molding step and/or the rolling step, it is also possible to allow an adhesive resin to exist together with the polyethylene. Examples of the adhesive resin are a modified ethylene (co)polymer obtained by grafting an ethylene polymer or an ethylene-α-olefin copolymer in the presence of an unsaturated carboxylic acid and/or a derivative thereof and an organic peroxide; an ethylene vinyl ester copolymer wherein the comonomer concentration is 30% by weight or less, and an ethylene-acrylic acid ester copolymer.

As mentioned above, the polyethylene stretched material can also be produced by dissolving the ultra-high-molecular-weight polyethylene powder in a solvent, and rolling and stretching the resulting gel-like material of sheet shape or stretching the gel-like material. In this case, the rolling and stretching conditions are desirably the same as mentioned above.

Thus, a polyethylene stretched material is obtained. The stretched material has a tensile modulus of ordinarily 60 GPa or more, preferably 80 GPa or more, more preferably 120 –150 GPa, and further preferably 120–200 GPa. The stretched material has a tensile strength of ordinarily 0.7 GPa or more, preferably 1 GPa or more, more preferably 1.5 GPA or more, and further preferably 2 GPa or more. The upper value of the tensile strength, although not limited, is ordinarily 5 GPa or less, and more preferably 3 GPa or less.

Splitting

The split polyethylene stretched material of the present invention can be produced by splitting the ultra-high-molecular-weight polyethylene stretched material obtained above. Splitting can be carried out by using a known splitting method. As the splitting method, there can be mentioned, for example, mechanical methods such as a method wherein a stretched material having a film shape, a sheet shape or the like is tapped, a method wherein said stretched material is twisted, a method wherein said stretched material is rubbed and a method wherein said stretched material is brushed; a method using an air jet; a method using an ultrasonic wave; and a method using a bomb blast.

Figure 5:
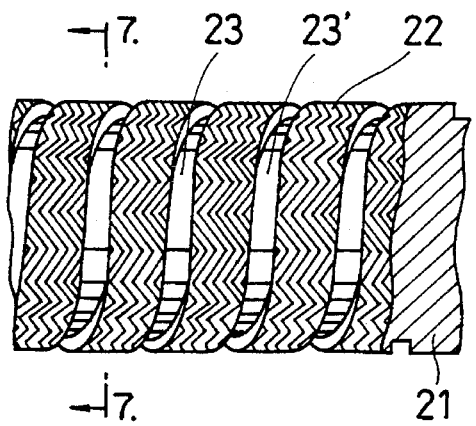
FIG. 5 is an example of the file-like splitter.

Mechanical methods are preferred in the present invention and a rotary type mechanical method is particularly preferred. Examples of such a mechanical method include methods using splitters of various shapes such as tapping screw-like splitter, file-like rough-surface splitter, needle roll-like splitter and the like. Desirably, the tapping screw-like splitter is ordinarily polygonal (pentagonal or hexagonal) and has screw threads of 10–40, preferably 15–35 per inch. Preferably, the file-like splitter is one invented by the present inventors (Japanese Utility Model No. 38980/1976) and shown in FIG. 5. In FIG. 5, the surface 22 of a shaft 21 having a circular cross section is a rough surface similar to the surface of a round file for ironworking, and two spiral grooves 23,23' are formed at equal intervals in the surface 22.

Figure 3:
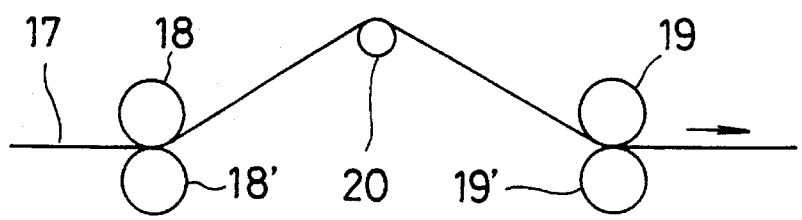
FIG. 3 is an example of the schematic illustration showing the practice of splitting.

The splitting apparatus used in the present invention has no particular restriction. However, as a typical example, there can be mentioned an apparatus as shown in FIG. 3 which consists basically of nip rolls 18,18', nip rolls 19,19' and a rotary splitter 20 arranged between these two sets of nip rolls and wherein a stretched tape 17 is transferred with a tension being applied thereto and is contacted with the rotary splitter. In this case, the transfer speed of the stretched material is not particularly restricted, but is ordinarily 1–1,000 m/min, preferably 20–300 m/min. The rotational line speed (peripheral speed) of the splitter can be appropriately selected depending upon the properties and transfer speed of polyethylene stretched material and the properties of intended split polyethylene stretched material, but is ordinarily 10–3,000 m/min, preferably 50–1,000 m/min. The desirable contact angle between stretched material and splitter is ordinarily 30°–180°, preferably 60°–90°. Since the stretched tape tends to slip, it is difficult in some cases to keep the tape speed at a predetermined level in the nip rolls arranged before and after the splitter; therefore, it is desirable to set up a measure for prevention of the above slipping by using nip rolls and crowbar rolls in combination, or by using Nelson rolls, or by combining these two approaches.

In the splitting method by brushing or the splitting method using a rotary splitter, the splitting operation is preferably carried out by applying a tension to the stretched material to be split. Desirably, this tension is applied in such a level that the stretched material undergoes deformation (elongation) of ordinarily 0.1–3%, preferably 0.5–2%, in view of the above-mentioned high tensile modulus of the stretched material. In this case, it is effective to instal, in the splitting apparatus, a tension controller such as dancer roll or the like in order to keep constant the tension applied to the tape.

The temperature employed in the splitting is ordinarily −20° to +100° C., preferably −5° to +50° C., more preferably 0°–20° C. The splitting can be carried out not only in one stage but also in multiple stages. In the case of a stretched material having a large thickness, the splitting can be conducted at the two surfaces, i.e. the front side and the back side. Specific examples of these methods are described in, for example, U.S. Pat. Nos. 2,185,789, 3,214,899, 2,954, 587, 3,662,935 and 3,693,851 and Japanese Patent Publication Nos. 13116/1961 and 16909/1968.

In the split polyethylene stretched materials obtained by these methods, the split yarn thickness is ordinarily 10–200 μm, preferably 30–100 μm. When the thickness is smaller than 10 μm, it occurs in some cases that the stretched material of film or sheet shape tears in the lengthwise direction and that the fibrils formed by splitting cause fluffing or wind round the splitter, making unstable the quality of the split product. A thickness larger than 200 μm tends to give poor splitting. The width of splitting is ordinarily 10–500 μm, preferably 50–200 μm.

The split polyethylene stretched material of the present invention has features of flexibility and high strength. The strength after splitting is ordinarily 0.4 GPa or more, and it can be increased, by twisting, to substantially the same level as before splitting. The tensile strength when 50–500 times/m of twisting has been applied, is 0.7 GPa or more, generally 1 GPa or more, more generally 1.5 GPa or more. These values correspond to high strengths of about 8 g/d or more, generally about 11.5 g/d or more, more generally about 17 g/d or more.

The polyethylene stretched material used in the present invention contains no polar group and accordingly has no surface activity. It makes printing or adhesion on or to the surface, generally difficult. Hence, as necessary, it is preferable to subject, before or preferably after splitting, the stretched material to a surface treatment such as corona discharge treatment, plasma treatment, oxidation treatment by chemical, flame treatment or the like.

The split polyethylene stretched material of the present invention can be used as it is or after being twisted. When it is twisted, the times of twisting are not particularly restricted but, as mentioned above, twisting of ordinarily about 50–500 times/m, preferably about 100–300 times/m is preferred because such twisting gives a high strength. The temperature of twisting is not particularly restricted but is ordinarily 0°–100° C., preferably 10°–60° C.

The split polyethylene stretched material of the present invention has the following usages owing to its features such as high strength, high modulus, lightweightness, slipperiness, gas permeability, water permeability, water resistance, chemical resistance, friction resistance, impact resistance, cut resistance, scratch resistance, creep resistance, weather resistance, fatigue resistance and the like.

The split polyethylene stretched material which has been subjected to twisting of required times, or a material containing it as a main component can be used for the production of ropes for sports and leisure wherein lightweightness, chemical resistance, friction resistance, creep resistance, weather resistance, fatigue resistance, etc. are required, such as rope for motorboat, rope for yacht, rope for parachute, rope for paraglider, rope for parasail, rope for balloon and the like; ropes for marine engineering works; ropes for ships; ropes for mountain climbing; and so forth. Said materials can also be used in bands for binding cotton, wool, used papers, etc. The split polyethylene stretched material, being voluminous and having a high strength, can also be used as various yarns for covering of electric wire. The split polyethylene stretched material, having cut resistance, can also be used in fishing nets, cutproof gloves, etc. The split polyethylene stretched material can also be used as a reinforcing material for tubes or hoses made of various materials, by winding round them.

The split polyethylene stretched material, by making, as it is or after having been subjected to twisting of required times, into a single-yarn or mixed-yarn fabric or a cross-laminated or obliquely-laminated reticulate non-woven fabric, can be used in balloons, flexible containers, tents, bags, knapsacks, explosion-proof sheets, cut-resistant clothes, helmet, safety belt for automobiles, belts for flexible containers, sails for hang gliders, sails for yachts, sails for surfboards, geotextiles, reinforcing agents for pressure containers, bulletproof jackets, shields for riot police, bulletproof materials for armoured vehicles and tanks, etc. Said reticulate non-woven fabric can also be used in applications wherein lightweightness, high modulus, cut resistance, scratch resistance, etc. are required, such as reinforcing material for concrete, reinforcing material for filter, and the like.

When two split polyethylene stretched materials are extended by spreading, cross-laminated to each other and then adhered to a film, a sheet or a fabric, the resulting film, sheet or fabric has lightweightness, high strength and cut resistance and can be used in explosionproof sheets, safety nets used at construction sites, tents, balloons, underlay sheets used for transfer of heavy goods or materials, sails for hang gliders, sails for yachts, sails for surfboards, filters, reinforcing agents for filters, radar domes, diaphragms for speakers, joint sheets, etc.

The split polyethylene stretched material, by cutting into fibers and mixing them with cellulose to make a paper, can be used as an ultra-high-strength paper, etc. Also, the split polyethylene stretched material, by making into a carpet, can be used as an artificial lawn of slipperiness. Also, the split polyethylene stretched material, by spreading and embedding into a concrete or a resin, can be used as three-dimensional reinforcing agents for buildings and structures.

The split polyethylene stretched material is made into a single-yarn fabric or a mixed-yarn fabric, or the split polyethylene stretched material is spread to an appropriate width and, optionally, a plurality of the spread materials are laminated in the same one direction (i.e. the stretching direction) or in different directions (e.g. in crossing relation). The above fabric (one or more), the above spread material, or the above laminated material each as a base material is impregnated with 20–200% by volume, preferably 40–100% by volume, more preferably 50–70% by volume, based on the base material, of a matrix resin consisting of at least one thermosetting resin such as epoxy resin, phenolic resin, unsaturated polyester, vinyl ester or the like, or the above base material is coated or sprayed with the matrix resin, whereby a prepreg is prepared. The prepreg, by making into a FRP sheet or board, can be used in automobiles, ship members, armour plates, canoes, snowmobile parts, ski boards, golf clubs, rackets, etc.

The present invention is hereinafter described specifically by way of Examples. However, the present invention is by no means limited to the Examples.

EXAMPLE 1

Production of ultra-high-molecular-weight polyethylene powder (a) Production of solid catalyst component 100 g of commercially available anhydrous magnesium chloride and 43 g of aluminum triethoxide were placed in a stainless steel pot having an internal volume of 4 liters. The pot contents were subjected to ball milling in a nitrogen atmosphere at room temperature for 5 hours. Then, 27 g of titanium tetrachloride was added and the resulting mixture was subjected to ball milling for 16 hours. The thus obtained solid catalyst component contained 40 mg/g of titanium.

(b) Production of ultra-high-molecular-weight polyethylene

A 20-liter stainless steel autoclave provided with an induction stirrer was purged with nitrogen. 10 liters of hexane was placed therein. Thereto were added 10 millimoles of triethylaluminum and 100 mg of the above-produced solid catalyst component. The resulting mixture was heated to 70° C. with stirring, and polymerization was carried out for 30 minutes while ethylene gas was continuously introduced so that the total pressure became 10 kg/cm$^2$.G.

After the completion of the polymerization, the resulting polymer slurry was taken out and subjected to vacuum distillation to remove hexane to obtain 950 g of a white polyethylene. The polyethylene had an intrinsic viscosity [η] of 14 dl/g as measured at 135° C. in decalin. As necessary, the above procedure was repeated to obtain the same polyethylene.

Shaping from ultra-high-molecular-weight polyethylene powder (1) Specification of compression-molding apparatus

| 1. Rolls | Diameter: 500 mm |
| --- | --- |
|  | Face length: 300 mm |
| 2. Steel belts | Thickness: 0.6 mm |
|  | Width: 200 mm |
| 3. Small-diameter rollers | Diameter: 12 mm |
|  | Face length: 250 mm |
| 4. Platens | Length: 1,000 mm |
|  | Width: 200 mm |
| 5. Hydraulic cylinders | Diameter: 125 mm |

Using a compression-molding apparatus of the above specification, a powder of an ultra-high-molecular-weight polyethylene having a viscosity-average molecular weight of about 2,000,000 was heated to 130° C. and pressed at an average pressure of about 6 kg/cm$^2$, whereby a compression-molded sheet of 1.1 mm in thickness and 100 mm in width was continuously produced at a speed of 1 m/min.

The sheet was then fed between a pair of upper and lower rolls opposed to each other, maintained at a surface temperature of 140° C., driven in opposite direction at the same peripheral line speed of 1 m/min, having a diameter of 150 mm and a surface length of 300 mm and disposed at an interval of 30 μm, whereby the sheet was rolled into a film having a draw ratio of 7-fold.

(2) Specification of stretching apparatus

| 1. Heating rolls | |
|---|---|
| Preheating metal rolls | Number of rolls: 3 |
| | Diameter: 250 mmφ |
| | Face length: 200 mm |
| Stretching metal roll | Number of roll: 1 |
| | Diameter: 125 mmφ |
| | Face length: 200 mm |
| A heat transfer oil is circulated inside each roll. | |
| The gap between any two adjacent rolls is 30 mm. | |
| 2. Cooling metal rolls | Number of rolls: 3 |
| | Diameter: 250 mmφ |
| | Face length: 200 mm |
| Water is circulated inside each roll. | |
| 3. Nip rolls | |
| Inlet side: | A 200 φ silicone rubber roll nips the two preheating metal rolls. |
| Outlet side: | A 200 φ silicone rubber roll nips the two cooling metal rolls. |

The rolled sheet was cut into a width of 20 mm by a slitter to obtain a tape. The tape was subjected to stretching using a stretching apparatus of the above specification.

Stretching was conducted three times under the conditions as shown in Table 1. The total draw ratio including the draw ratio by rolling was 105-fold, and the stretched tape had a width of 6.5 mm and a thickness of 60 μm.

TABLE 1

| | Metal roll temperature (°C.) | | Nip roll circumferential speed (m/min) | | Draw ratio |
|---|---|---|---|---|---|
| | Preheating | Stretching | Inlet | Outlet | (times) |
| First | 135 | 140 | 1 | 4 | 4 |
| Second | 140 | 145 | 4 | 10 | 2.5 |
| Third | 140 | 150 | 10 | 15 | 1.5 |
| Total | | | | | 15 |

The stretched tape was split by a splitting apparatus as shown in FIG. 3. That is, the stretched tape 17 was split by a splitter 20 under a tension at a speed difference of 1.2% between nip rolls 18,18' and nip rolls 19,19'. The conditions used for the splitting were as follows.

Figure 4:
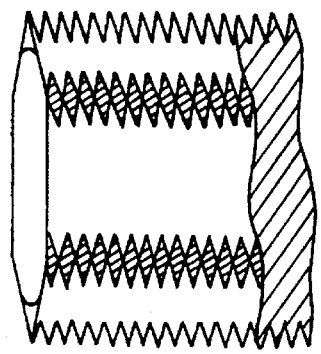
FIG. 4 is an example of the tapping screw-like splitter used in Example 1.

| Film speed | 18, 18': 20.0 m/min |
| | 19, 19': 20.24 m/min |
| | (speed ratio: 1.2%) |
| Splitter | A hexagonal rod having, at one end, projections similar to a tapping screw having 32 threads per inch (FIG. 4). |
| | Maximum diameter: 25 mmφ |
| Contact angle of splitter: | 90° |
| Rotational speed of splitter: | 800 rpm (surface speed: 62.8 m/min) |
| Sliding ratio of film: | 3.14 (rotational speed of splitter/film speed) |

Figure 6:
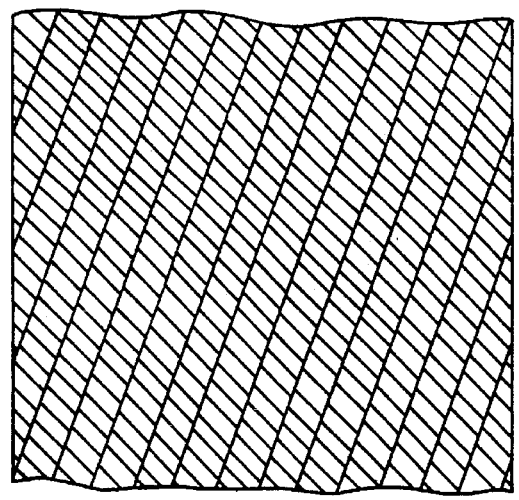
FIGS. 6 and 7 are the illustrations of reticulate products obtained in Examples 1 and 2, respectively, when spread to the crosswide direction.

The stretched tape of 6.5 mm in width was split regularly as shown in FIG. 6. (In FIG. 6, the split yarn is shown by spreading it in the crosswise direction; as a result, the thin branches are directed more to the crosswise direction as compared with the condition before spreading.)

Number of cracks measured in crosswise direction

Thick trunks: 8

Thin branches: 8

The split tape was subjected to twisting of 250 times/m and then measured for properties. The split tape after twisting had a tensile strength of 1.9 GPa and a modulus of 105 GPa.

EXAMPLE 2

Figure 7:
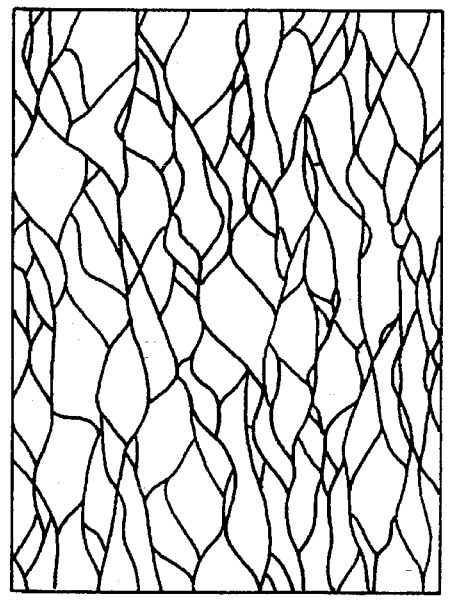

There was used a splitter as shown in FIG. 5, i.e. a file in which spiral grooves had been formed (described in Japanese Utility Model No. 38980/1976). The diameter of the splitter was also 25 mmφ. Splitting was conducted with other conditions made same as in Example 1, and there was obtained a split tape as shown in FIG. 7 which was an integrate of thin random fibers.

Number of cracks measured in crosswise direction: 38

The split tape was subjected to twisting of 200 times/m and then measured for properties. The split tape after twisting had a tensile strength of 1.5 GPa and a modulus of 95 GPa.

EXAMPLE 3

The same procedure as in Example 1 was repeated except that the ultra-high-molecular-weight polyethylene was pressed at an average pressure of about 50 kg/cm$^2$ to continuously produce a compression-molded sheet of 1 mm in thickness and 100 mm in width at a speed of 0.8 mm/min.

The split tape obtained was subjected to twisting of 250 times/m and then measured for properties. The split tape after twisting had a tensile strength of 1.8 GPa and a modulus of 115 GPa.

Melting point and other properties were measured as follows.

Melting point

A sample (5 mg) was set in a DSC apparatus. The sample was measured at a heating rate of 10° C/min- The endothermic peak temperature obtained was recorded as its melting point.

Tensile strength, tensile modulus and bonding strength

Tensile strength and tensile modulus were measured at 23° C. and a tensile rate of 100 mm/min, using a tensile testing machine "Strograph R". The tensile modulus was calculated using the stress at 0.1% strain. The cross-sectional area of a test piece, said area being needed for the calculation, was determined by measuring the weight and length of the test piece under the assumption that the density of polyethylene be 1 g/cm$^3$.

Using the same testing machine, the interlaminar strength of the sample was determined when the sample was peeld off over 180° at a pulling rate of 150 mm/min. The interlaminar strength was recorded as the bonding strength.

What is claimed is:

1. A split polyethylene stretched material having a tensile strength of 0.7 to 5 GPa when twisted in the range of 50–500 times/m, which material is produced by subjecting a polyethylene having an intrinsic viscosity of 5–50 dl/g as measured at 135° C in decalin, to compression-molding at a temperature lower than the melting point of the polyethylene to obtain a sheet, subjecting the sheet to rolling and stretching and then subjecting the stretched polyethylene to splitting, wherein the splitting is carried out using a tapping screw-like splitter or a file-like splitter.

2. The stretched material of claim 1, wherein the compression molding is carried out by holding the polyethylene between endless belts and transferring the endless belts.

3. The stretched material of claim 1, wherein the pressure during the compression molding is in the range of 0.01 MPa and 2 GPa and the temperature during the compression molding is in the range of 20° C.–140° C.

4. The stretched material of claim 1, wherein the total draw ratio of the rolling and the stretching is between 20-fold and 200-fold.

5. The stretched material of claim 4, wherein the total draw ratio is in the range of 80-fold and 200-fold.

6. The stretched material of claim 1, wherein the splitting is carried out to such an extent that the stretched polyethylene undergoes a deformation (elongation) in the range of 0.1–3%.

7. The stretched material of claim 1, wherein the transfer speed of the stretched polyethylene is 1–1,000 m/min and the rotational line speed of the splitter is 10–3,000 m/min.

8. The stretched material of claim 7, wherein the contact angle between the stretched polyethylene and the splitter is 30°–180°.

9. The stretched material of claim 6, wherein the splitting is carried out at a temperature in the range of –5° to +50° C.

10. The stretched material of claim 6, which has a thickness of 10–200 μm.

11. The stretched material of claim 1, which has a tensile strength of 1 to 5 GPa.

12. The stretched material of claim 11, which has a tensile strength of 1.5 to 5 GPa.

13. A process for producing a split polyethylene stretched material having a tensile strength of 0.7 to 5 GPa when twisted in the range or 50–500 times/m, which process comprises subjecting a polyethylene having an intrinsic viscosity of 5–50 dl/g as measured at 135° C in decalin, to compression molding at a temperature lower than the melting point of the polyethylene to obtain a sheet, subjecting the sheet to rolling and pulling to successively stretch the sheet, and subjecting the stretched sheet to splitting, wherein the splitting is carried out using a tapping screw-like splitter or a file-like splitter.

14. The stretched material of claim 1, which has a tensile strength of 1–3 GPa.

* * * * *